United States Patent
Burton et al.

(10) Patent No.: US 6,453,331 B1
(45) Date of Patent: Sep. 17, 2002

(54) METHOD AND SYSTEM FOR FILTERING FORCE CONSTANT TABLE FOR ACCURATE TORQUE MODELING

(75) Inventors: Matthew Chad Burton, Edmond; Jason Dale Gregg, Oklahoma City, both of OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/364,465

(22) Filed: Jul. 30, 1999

Related U.S. Application Data
(60) Provisional application No. 60/100,287, filed on Sep. 14, 1998.

(51) Int. Cl.⁷ .............................................. G06F 17/10
(52) U.S. Cl. ...................................................... 708/300
(58) Field of Search ................................. 708/300, 319

(56) References Cited

U.S. PATENT DOCUMENTS

| | | |
|---|---|---|
| 5,132,855 A | 7/1992 | Waugh et al. |
| 5,835,302 A | 11/1998 | Funches et al. |
| 6,218,801 B1 * | 4/2001 | Brogårdh et al. ........... 318/567 |

* cited by examiner

*Primary Examiner*—Tan V. Mai
(74) *Attorney, Agent, or Firm*—Merchant & Gould P.C.

(57) ABSTRACT

A method and system of filtering an unfiltered servo torque table of a disc drive where a plurality of data points are added to the beginning and end of the unfiltered servo table and the table is then shifted by a valve and then filtered.

20 Claims, 5 Drawing Sheets

METHOD AND SYSTEM FOR FILTERING FORCE CONSTANT TABLE FOR ACCURATE TORQUE MODELING

RELATED APPLICATIONS

This application claims the benefit of provisional application Serial No. 60/100,287 entitled "Force Constant Table Filtering For Accurate Torque Modeling" filed on Sep. 14, 1998.

FIELD OF THE INVENTION

The present invention relates generally to a method and system for accurately modeling a disc drive's servo torque constant. More particularly, the present invention relates to a method and system for accurately modeling the servo torque constant of a disc drive by filtering its force constant table to more accurately model the servo torque.

BACKGROUND OF THE INVENTION

Disc drives of the type referred to as "Winchester" disc drives are well known in the industry. Such disc drives incorporate a "stack" of one or more disc-shaped platters mounted on a spindle motor for constant high speed rotation. The surface of these discs is coated with a magnetizable medium for the recording of digital data in a plurality of circular, concentric data tracks.

A number of read/write heads act in cooperation with the disc surfaces for the recording and retrieval of data. These heads are attached to an actuator mechanism which operates under the control of electronic circuitry to controllably move the heads from track to track.

Over the years, the market has demanded disc drives of greater capacity and faster access capability than could be achieved using stepper motors to drive the actuator. This lead to the increasing prevalence of the use of voice coil motors to drive the actuator. Early linear voice coil motors, which drove the read/write heads on a straight radial line across the disc surface, have currently been largely superceded by rotary voice coil actuators, because of their compact size and reduced moving mass, thus permitting smaller disc drive packages with faster access speeds.

A typical rotary voice coil actuator, also sometimes referred to as a voice coil motor or VCM, consists of an arrangement of permanent magnets fixed relative to the housing of the disc drive, and a coil (or coils) mounted on the movable portion of the actuator within the magnetic field of the permanent magnets. When controlled current is applied to the coil, a magnetic field is generated surrounding the coil which interacts with the magnetic field of the permanent magnets to force movement of the coil and actuator body on which the coil is mounted. The amount of force generated by this magnetic interaction (and thus the torque capability of the motor) is dependent on many factors including the strength of the permanent magnets, the size and number of turns in the coil, the amount of current applied to the coil, and the proximity of the coil to the magnets. Advances in materials science, manufacturing technology and electronic controls have lead to the current generation of disc drives which use rotary voice coil actuators to provide capacities of several hundred megabytes with average access times of less than fifteen milliseconds.

A high volume disc drive manufacturer can expect to build several hundred thousand, or even several million, of the same disc drives over the life of the product. It is therefore impossible, without economically prohibitive controls, to produce perfectly uniform magnets for use in these products, and magnet strength, of necessity, can therefore be expected to vary from unit to unit by as much as +10%. Similarly, the magnetic strength within a given magnet is not absolutely uniform and will therefore cause the strength of magnetic interaction between the permanent magnets and the magnetic field of the moving coil of a voice coil actuator to vary dependent upon the relative position of the coil to the magnets.

In addition, the flux lines between the upper and lower servo magnets are not constant with imperfect magnets. This causes the actual servo torque to vary as the coil moves between the magnets. The servo torque constant is a scaler that represents the torque output (ounce-inches) per current input (amps) in a servo control system. In addition, the flux lines tend to bend outward around the edges of the magnets so that the density of the field is smaller in those areas. Thus, the servo torque per unit decreases as the coil moves toward the magnet edges. A higher loop gain is needed at locations where the torque is lower and a lower loop gain is needed where the torque is higher.

Figure 1:
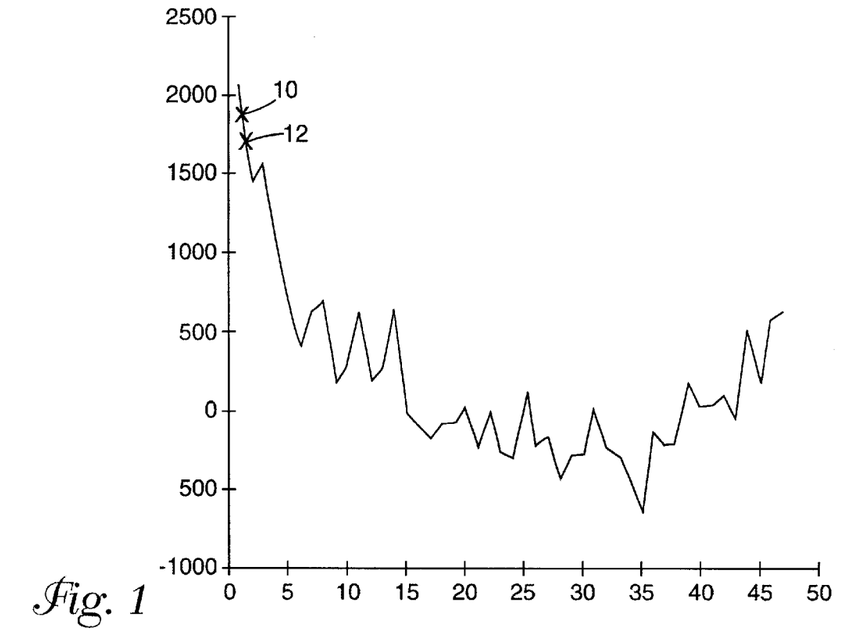
FIG. 1 is a plot of a typical ZTAB table after factory calibration.

In order to have consistent seek times and loop bandwidths across the media surface of a hard disc drive, it is necessary to have an accurate model of the torque constant. Because of the factors described above, i.e., variations in flux lines and imperfect magnets, it is necessary to obtain an accurate model of the servo torque versus servo position. This is currently done in the manufacturing process through an interactive method at a discrete set of locations, i.e., zones, on the disc and is stored in a non-volatile location on the drive. The result is a table of gains versus position, where the gain is inversely proportional to the actuator torque. The table is commonly referred to as the ZTAB table. FIG. 1 is a plot of a typical ZTAB table after factory calibration.

The table is then used in the equation FCON2=FCONHI* (1+ZTAB(current_zone)) to compute the loop gain. FCONHI is the variable that is adapted based on position error during a seek, and FCON2 is the error, or loop, gain. If the ZTAB table has the correct values for modeling the torque of the servo, FCONHI will ideally adapt to the same value at any location on the disc. Therefore, it is desired to have an ZTAB table that accurately models the torque curve of the actuator system.

As mentioned above, the ZTAB is currently calibrated in a factory process. This table is a set of values that represent the inverse of the actuator torque at a set number of zones. A zone is preferably 256 tracks wide, although other parameters may be used and each zone has a corresponding ZTAB value for the torque. Zone numbering begins at the outer diameter of the disc and moves inward. The calibration process entails starting at the outer diameter of the disc, calibrating the gain for zone zero, and then seeking to and calibrating each even numbered ZTAB zone until the inner diameter of the disc is reached. The odd numbered zones are then calibrated in decreasing order while moving to the outer diameter. The resulting table tends to be noisy due to bearing bias hysterisis and other nonlinearities as can be seen from FIG. 1 where zones of the disc are plotted along the horizontal axis and gain is plotted along the vertical axis. This jaggedness results in inaccurate torque modeling and loop gain variation as the disc is traversed. Therefore, a method is needed to smooth the table before it is stored in drive memory for end user benefit. Accordingly, there is a continual need for improvements in the art whereby the servo torque can be accurately modeled and loop gain calculated.

The present invention provides a solution to the above and other problems and offers the above and other advantages over the prior art.

SUMMARY OF THE INVENTION

According to a first aspect of the invention there is provided a method of filtering an unfiltered servo torque table of a disc drive wherein the servo torque table plots a gain of the servo versus a position of the servo wherein the gain of the servo is inversely proportional to its torque. The method includes the steps of adding a plurality of data points to a beginning and an end of the unfiltered servo torque table, shifting every data point of the unfiltered table by a value, and filtering the shifted unfiltered table.

According to a second aspect of the invention there is provided a computer program embodied on a computer readable medium for filtering an unfiltered servo torque table of a disc drive. The computer program includes a code segment that adds a plurality of data points to a beginning and end of the unfiltered servo table, a code segment that shifts every data point of the unfiltered servo torque table by a value, and a code segment that filters the shifted unfiltered servo torque table.

According to a third aspect of the invention, there is provided a system for filtering an unfiltered servo torque table of a disc drive. The system includes an adder that adds a plurality of data points to a beginning and end of the unfiltered servo table, a shifter that shifts every data point of the unfiltered servo torque table by a value, and a filter that filters the shifted unfiltered servo torque table.

DETAILED DESCRIPTION

Figure 2:
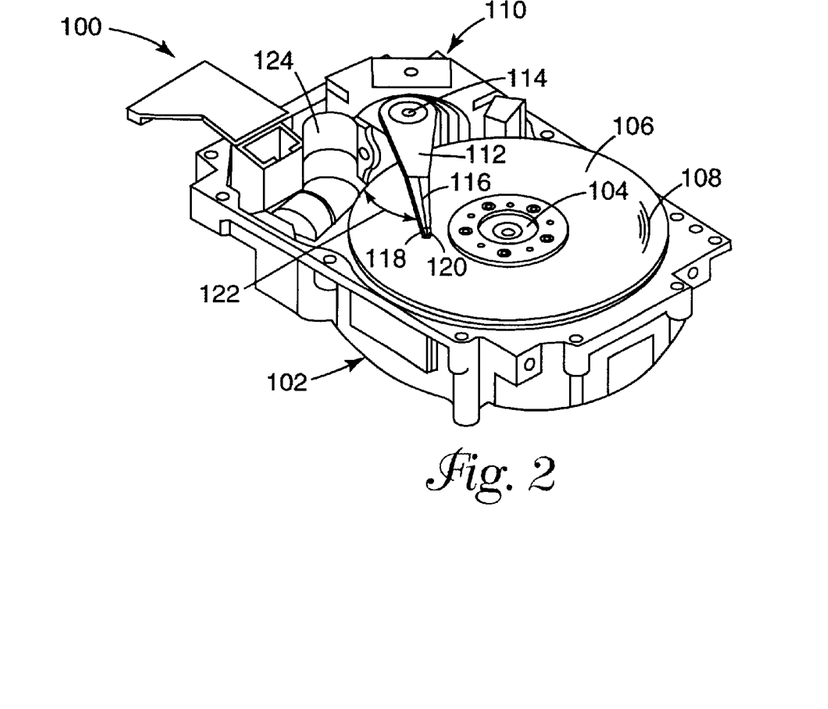
FIG. 2 is a perspective view of a disc drive with its cover removed.

Referring to the drawings and specifically to FIG. 2, shown is a disc drive 100, with the top cover (not shown) removed, in which the present invention is particularly useful. The disc drive 100 includes a base casting 102, sometimes referred to as a base member, to which other mechanical components are mounted. A spindle motor 104 is mounted to the base casting 102 and supports a plurality of discs 106 for rotation. The surfaces of the discs 106 include a multiplicity of tracks 108. An actuator motor, shown generally at 110, serves to rotate an actuator body 112 about a pivot shaft 114 under control of electronic circuitry (not shown). The actuator body 112 includes a number of head mounting arms 116 which in turn mount a number of head supports 118, each mount a head 120. As the actuator body 112 is rotated about the pivot shaft 114, the heads 120 are moved across the discs 106 along an arcuate path 122 to provide access to the tracks 108. The actuator motor 110 is the type referred to as a rotary voice coil actuator, and drive current to control the movement of the coil (not shown) and consequently the actuator body 112 and heads 120 is brought to the coil via a printed circuit cable 124, which also forms the signal path for write signals to the heads 120 and read signals from the heads 120.

Figure 3:
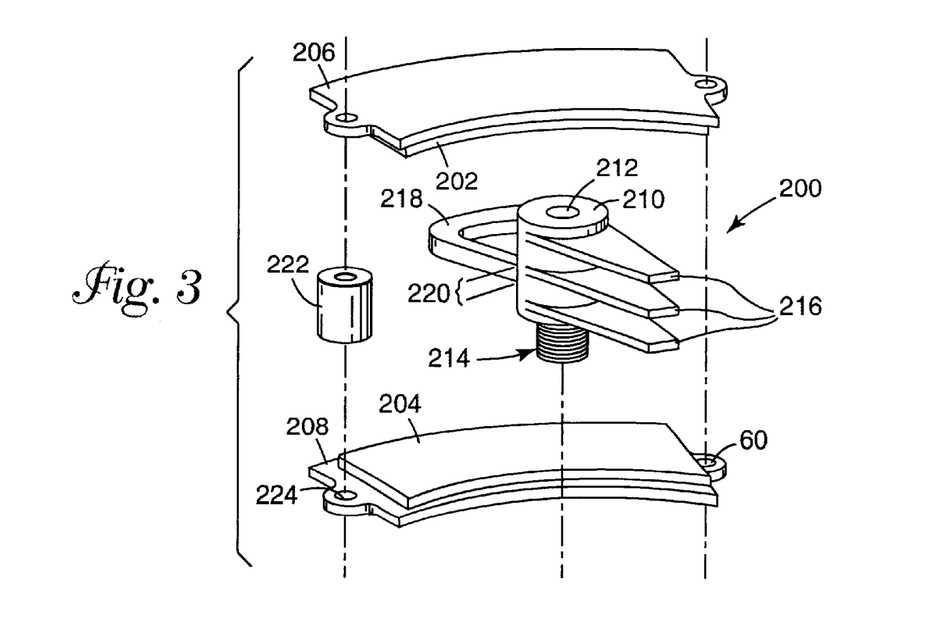
FIG. 3 is a exploded perspective view of a voice coil actuator.

FIG. 3 is an exploded perspective view of a voice coil actuator 200, such as that shown in FIG. 2. An upper permanent magnet 202 and a lower permanent magnet 204 are fixedly mounted to an upper backing plate 206 and a lower backing plate 208, respectively. An actuator body 210 is mounted to a pivot shaft 212 using a system of ball bearings (not shown) so that the actuator body 210 is pivotable about the pivot shaft 212. The pivot shaft 212 itself includes a threaded end 214 for attaching the pivot shaft 212 to the base casting 102. Alternatively, the pivot shaft 212 could include a tapped hole (not shown) in its lower end to receive a screw (also not shown) for attaching the pivot shaft to the base casting.

The actuator body 210 includes a number of head mounting arms 216 which may be an integral part of the actuator body 210 or separately fabricated and fastened thereto. Also fixedly attached to the actuator body 210 is a coil 218, two ends 220 of which are connected via cable 124 to electronic circuitry (not shown). When the actuator 200 is assembled into the disc drive 100, the lower backing plate 208 is brought to rest on the base casting 102, and the pivot shaft 212 is fixed to the base casting 102 with the coil 218 overhanging the lower magnet 204. An arrangement of spacers 222 (one shown) is then placed atop mounting holes 224 in the lower backing plate 208 and the upper mounting plate/upper magnet assembly 206/202 is placed atop the spacers 222 and the assembly completed by attaching the backing plates 202, 204 and spacers 222 to the base casting 102 using screws (not shown) through the mounting holes 224.

When the actuator 200 is thus assembled, the coil 218 is disposed between the upper and lower magnets 202, 204 with a narrow air gap (not designated) separating the surfaces of the magnets 206, 208 from the coil 218. When DC current is applied to the ends 220 of the coil 218, a resulting magnetic field (not shown) is created about the coil 218, a resulting magnetic field (not shown) is created about the coil 218 and this magnetic field interacts with the magnetic field of the permanent magnets 202, 204 to cause the actuator body 210 to rotate about the pivot shaft 212, moving the heads 120 of FIG. 2 across the discs 106. The backing plates 206, 208 and spacers 222 form the mechanical support structure for the permanent magnets 202, 204, and are formed from steel or other magnetically permeable material to form a secondary flux path for the magnets 202, 204.

Various modifications to the basic components shown have been employed in the art. For instance, the backing plates 206, 208 can be appropriately configured in the areas of the mounting holes 224 to eliminate the need for the spacers 222, or the permanent magnets 202, 204 can be replaced by discrete magnet portions without changing the basic operating principles controlling the operation of the actuator motor 200.

Variations in the magnetic material and in the process used to magnetize the magnets 202, 204 result in changes in the intensity of the magnetic field of the magnets 202, 204 as the actuator body 210 rotates about the pivot shaft 212 and changes the position of the coil 218 relative to the magnets 202, 204.

Figure 4:
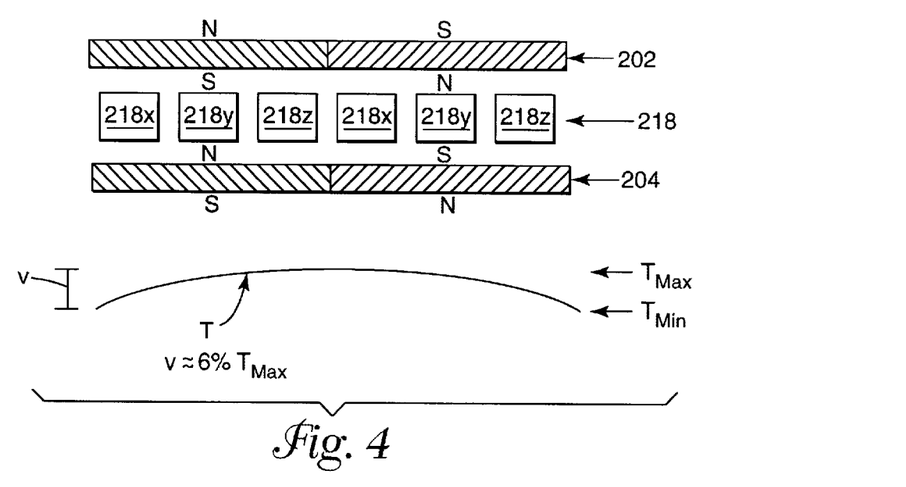
FIG. 4 is a simplified functional block diagram of a servo system with which the present invention is particularly useful.

Yet another position-dependent variable is depicted in FIG. 4, which is simplified cross-sectional view of the permanent magnets 202, 204 and the coil 218. In FIG. 4, the polarization of the permanent magnets 202, 204 is represented by the diagonal crosshatching. On the left side of the figure, the magnets 202, 204 are crosshatched lower left to upper right, indicating a north-south polarity from top to bottom, while on the right side of the figure, the crosshatching runs from upper left to lower right, indicating a south-north polarity from top to bottom. Cross sections of the radially extending side arms of the coil 218 are depicted with the coil 218 in three different positions. Sections labeled 218x represent the two arms of the coil 218 when the coil 218 has moved to its leftmost position relative to the magnets 202, 204, while the sections labeled 218y and 218z show the coil centered on the magnets 202, 204 and in its rightmost position relative to the magnets 202, 204, respectively.

FIG. 4 illustrates that when the coil 218 is centered on the magnets 202, 204, the coil sections 218x lie in the center of the magnetic fields generated by the magnets. However, when the coil 218 moves to the left, as shown by coil sections 218x, or to the right, as shown by coil sections 218z, the coil 218 approaches the edge of the magnetic field, thus reducing the torque capability of the motor 200 as the heads (not shown) on the opposite side of the actuator body 210 move toward the innermost and outermost tracks, while the magnetic strength of the interaction between the coil 218 and the magnets 202, 204 is greatest as the heads approach the center of their range of motion. This tendency is shown by the torque curve T at the bottom of FIG. 4. As the curve T shows (without considering the effects of localized variations in the magnetic strength of the magnets), the variation (V) between the minimum torque ($T_{min}$) at the ends of the range of motion of the actuator motor 200 and the maximum torque ($T_{max}$) at the center of the range of motion of the actuator motor 200 can be as much as 6% of the maximum torque (($T_{max}$) This positional variance (V) in the torque capability can degrade the performance of the disc drive unless the variance (V) can be canceled out by compensation.

Figure 5:
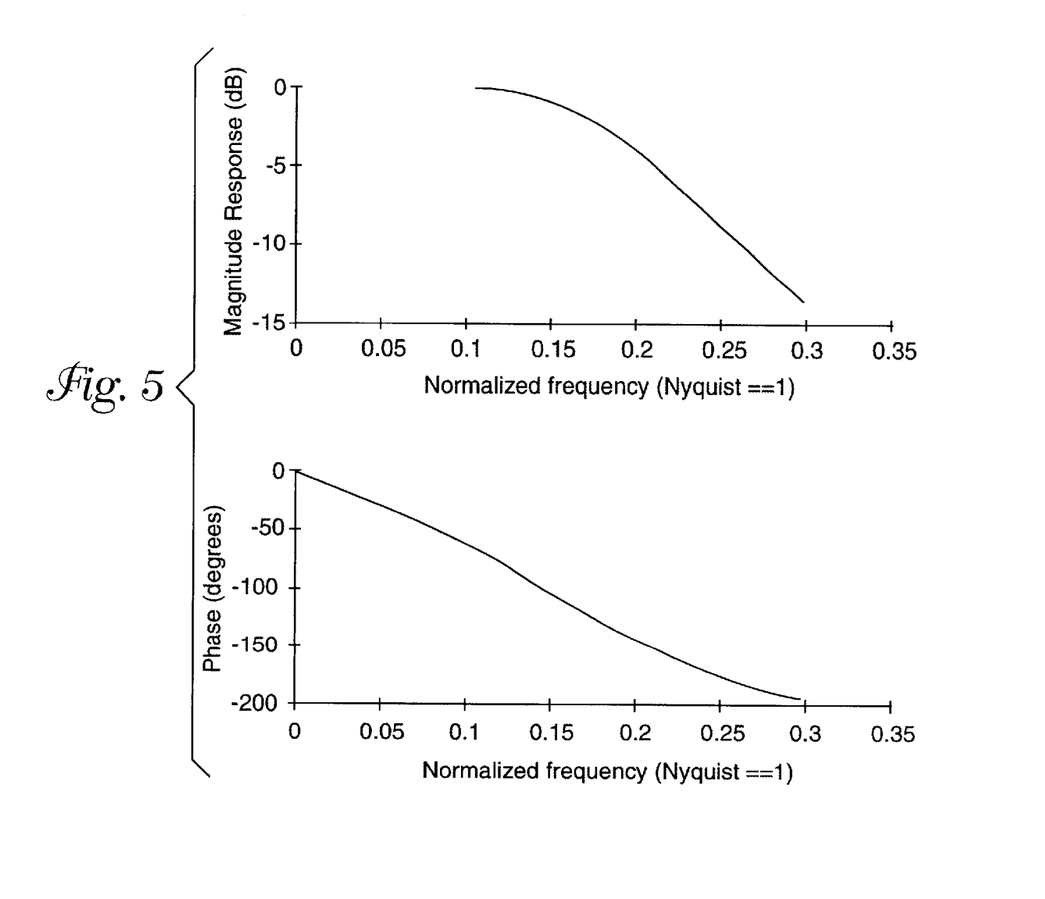
FIG. 5 is the frequency response of a filter used according to a preferred embodiment of the present invention.

In order to filter the ZTAB table shown in FIG. 1, the frequency range that should be retained and that which should be attenuated must be identified. Careful analysis of the ZTAB table shown in FIG. 1 indicates that the table has a single fundamental frequently because it appears that the table is essentially a half sine-wave with noise. Therefore, the period of the fundamental sinusoid is twice the table length, 2*47 samples. For simplicity, and without loss of significant accuracy, it is assumed that the period is 100 samples. Based on this, the table's fundamental digital frequency is (2*π)/100. Since the noise of the table is of high frequency content, application of a low-pass filter is desired. However, the cutoff frequency of the filter can not be set too close to the fundamental because magnet characteristics such as material porosities, magnet notches, etc., would be filtered out. Empirical experimentation has demonstrated that a cutoff frequency of three times the fundamental frequency retains these magnet characteristics while removing the noise. With this in mind, in a preferred embodiment a $3^{rd}$ order digital Butterworth filter was selected to supply ample attenuation to the high frequency noise while not affecting the fundamental frequency. Of course, other filters could be used as elliptical, Chebychev, and nonlinear fillers. The resulting digital filter has the following realization:

$$y(k)=0.015558*u(k)+0.046675*u(k-1)+0.046675*u(k-2)+0.015558*u(k-3)+1.829880*y(k-1)-1.254475*y(k-2)+-0.300128*y(k-3)$$

where u(k) is the kth input (the ZTAB table to be filtered) and y(k) is the output (the filtered ZTAB). This filter has the frequency response shown in FIG. 5 below.

Figure 7:
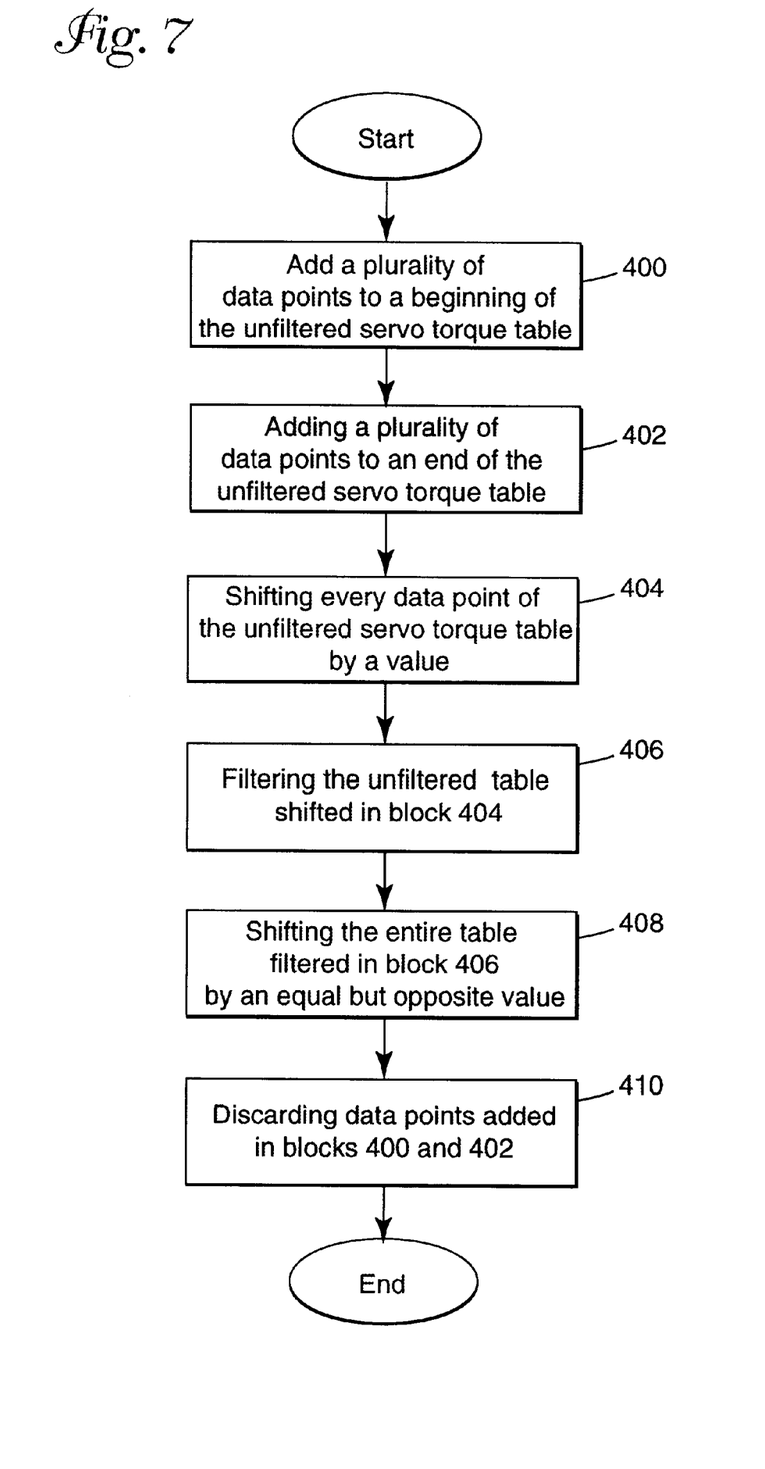
FIG. 7 is a flow cart of a computer program according to a preferred embodiment used to carry out the steps of the invention.

Because filters require initial conditions, and because of filter phase loss, it is necessary to modify the unfiltered ZTAB table shown in FIG. 1 before and after filtering. In a preferred embodiment the filtering technique is embodied as a computer program on a computer readable medium FIG. 7 is a flow chart of the steps performed by the computer program used to carry out the present invention. Before the table is filtered, at step 400 three additional data points are added to the beginning of the table to initialize the filter states before filtering the actual table values. This is done by using the first two table points (10, 12 FIG. 1) to form a linear equation (y=mx+b), from which three additional data points can be extrapolated and concatenated with the beginning of the table. The same method is also performed at step 402 at the end of the table to obtain four extra endpoints to account for filter delay (phase loss), which is discussed below. Thus, the resulting table will be the length of the original table plus seven. One more modification is still needed because if the current concatenated table is filtered, the filter's transient response would result in a severely mangled table. This is best accomplished by shifting the entire table at step 404 down by subtracting the value of the first table point (the value obtained from linear extrapolation) from each table point. This value should be retained for later. The resulting table will begin with a value of zero and go negative from there.

Figure 6:
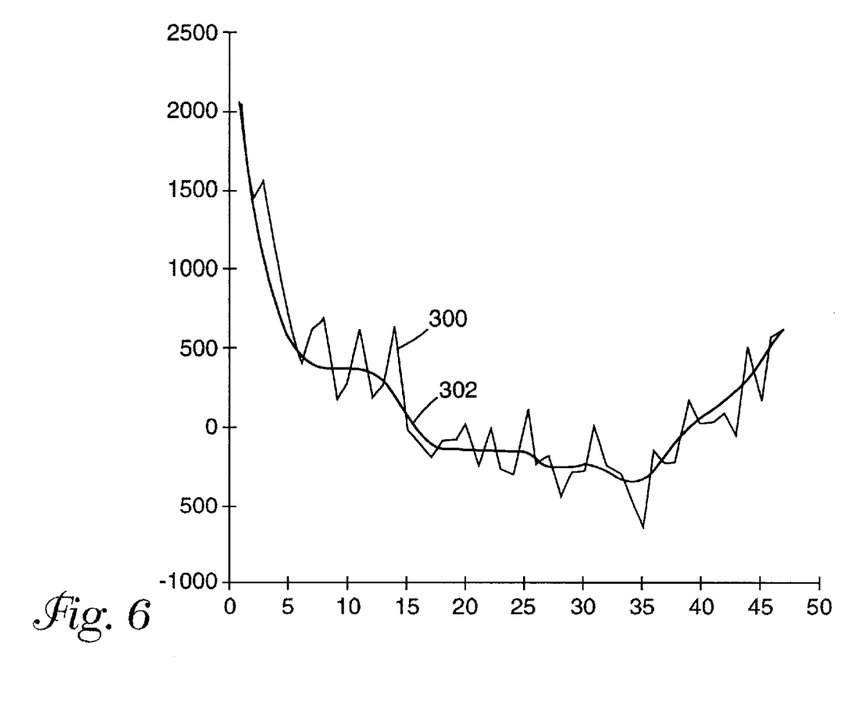
FIG. 6 is a plot of a ZTAB table before and after filtering according to a preferred embodiment of the invention.

Now the table can be filtered at step 406 with the above filter difference equation. After this is complete, the table values must be shifted back up by the same amount that they were shifted down before filtering at step 408 and the first three data points and the last four data points of the filtered table must be thrown away at step 410. The first three are thrown away to account for the three that were added in the linear extrapolation stage, and the next four are discarded to shift the table up in time to compensate for the filter delay. The result is a smoothed version of the original table which will lower gain variation across the hard disc surface. FIG. 6 is a plot of a ZTAB table before filtering 300 and after filtering 302. The computer program performs a method of filtering an unfiltered servo torque table of a disc drive wherein the servo torque table plots a gain of the servo versus a position of the servo wherein the gain of the servo is inversely proportional to its torque. The method includes the steps of adding a plurality of data points to a beginning of the unfiltered servo torque table, adding a plurality of data points to the end of the unfiltered servo torque table, shifting every data point of the unfiltered table by a value, and filtering the shifted unfiltered table.

In summary, the present invention provides a method of filtering an unfiltered servo torque table of a disc drive wherein the servo torque table plots a gain of the servo versus a position of the servo wherein the gain of the servo is inversely proportional to its torque. The method includes steps of adding a plurality of data points to a beginning and end of the unfiltered servo torque table (400 and 402), shifting every data point of the unfiltered stable by a value (404) and, filtering the shifted unfiltered table (406).

In addition, the present invention provides a computer program embodied on a computer readable medium for filtering an unfiltered servo torque table of a disc drive. The computer program includes a code segment that adds a plurality of data points to a beginning and end of the unfiltered servo table (400 and 402), a code segment that shifts every data point of the unfiltered servo torque table by a value (404) and a code segment that filters the shifted unfiltered servo torque table (406).

Furthermore, the present invention provides a system for filtering an unfiltered servo torque table of a disc drive. The system includes an adder that adds a plurality of data points to a beginning and end of the unfiltered servo table, a shifter that shifts every data point of the unfiltered servo torque table by a value and a filter that filters the shifted unfiltered servo torque table.

Figure 8:
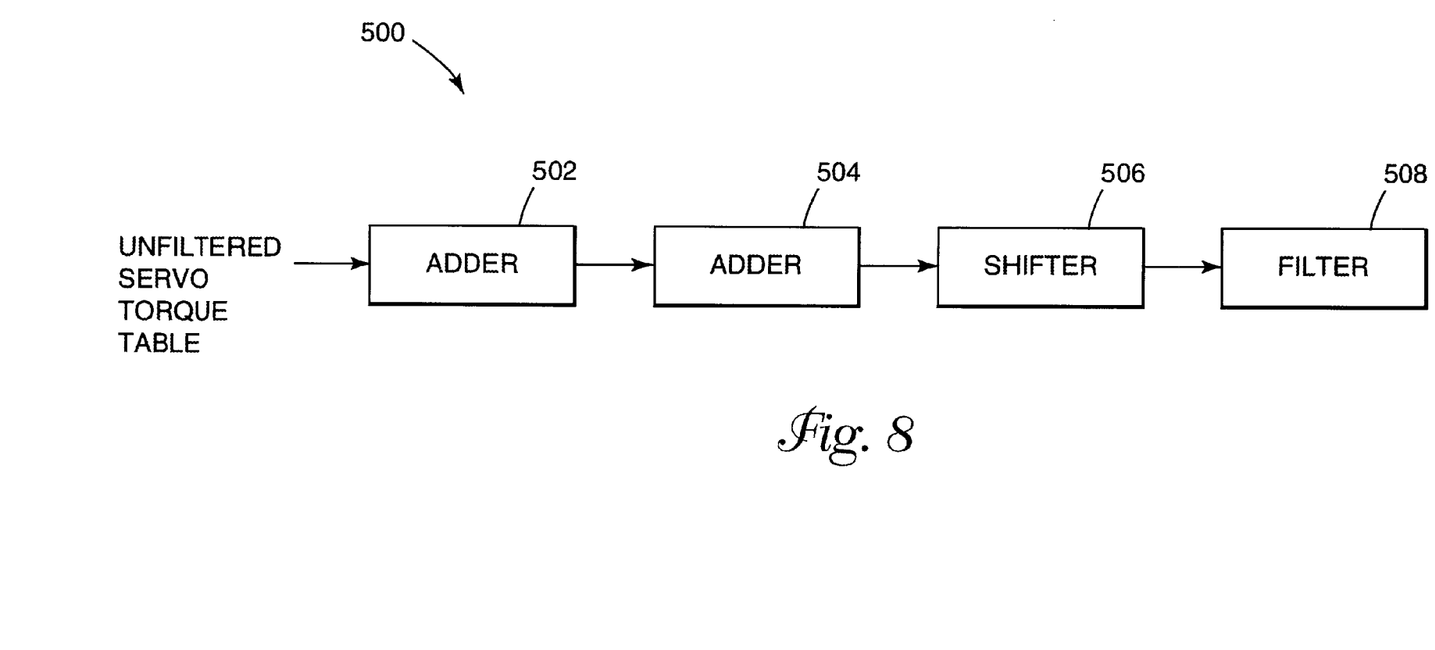
FIG. 8 is a block diagram of the system according to a preferred embodiment of the present invention.

FIG. 8 is a block diagram of the system 500 according to a preferred embodiment of the present invention. The system 500 includes a first adder 502, a second adder 504, a shifter 506 and a filter 508. The adder 502 adds a plurality of data points to a beginning of the unfiltered servo table and adder 504 adds a plurality of data points to the end of the unfiltered servo table.

The shifter 506 shifts every data point of the unfiltered servo torque table by a valve and the filter 508 filters the unfiltered servo torque table shifted by the shifter 506.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method of filtering an unfiltered servo torque table of a disc drive wherein the servo torque table plots a gain of the servo versus a position of the servo wherein the gain of the servo is inversely proportional to its torque, the method comprising steps of:
   (a) adding a plurality of data points to a beginning of the unfiltered servo torque table;
   (b) adding a plurality of data points to an end of the unfiltered servo torque table;
   (c) shifting every data point of the unfiltered table by a value; and
   (d) filtering the unfiltered table shifted in step (c).

2. The method of claim 1 wherein the filtering step (c) is performed by a third order filter.

3. The method of claim 1 wherein the filtering step (c) is performed by a third order Butterworth filter.

4. The method of claim 1 wherein the filtering step (c) is performed by a low-pass filter.

5. The method of claim 1 further comprising steps of (e) shifting the entire table filtered in step (d) by an equal but opposite value as it was shifted in step (c); and (f) discarding the data points added in adding steps (a) and (b).

6. The method of claim 1 wherein the adding step (a) compromise steps (a)(i) of using a first two data points of unfiltered table to generate a linear equation; and (a)(ii) using the linear equation generated in step (a)(i) to extrapolate a first, second and third additional data points.

7. The method of claim 1 wherein the adding step (b) comprises steps of (b)(i) using a last two data points of the unfiltered table to generate a linear equation; and (b)(ii) using the linear equation generated in step (b)(i) to extrapolate four additional data points.

8. The method of claim 1 wherein the shifting step (c) comprises a step (c)(i) of shifting every data point of the unfiltered table by subtracting the first additional data point from every data point.

9. The method of claim 5 wherein the shifting step (c) comprises a step (c)(i) of shifting every data point of the unfiltered table by subtracting the first additional data point to every data point of the unfiltered table and step (e) comprises a step (e)(i) of shifting every data point of the filtered table by adding the first additional data point to every data point of the filtered table.

10. A computer program embodied on a computer readable medium for filtering an unfiltered servo torque table of a disc drive comprising:
   (a) a code segment that adds a plurality of data points to a beginning of the unfiltered servo table;
   (b) a code segment that adds a plurality of data points to an end of the unfiltered servo torque table;
   (c) a code segment that shifts every data point of the unfiltered servo torque table by a value; and
   (d) a code segment that filters the unfiltered servo torque table shifted in by code segment (c).

11. The computer program of claim 10 wherein code segment (a) adds the additional data points to the beginning of the unfiltered servo table by using a first two data points to generate a linear equation and using the linear equation to extrapolate three additional data points.

12. The computer program of claim 10 wherein code segment (b) adds four additional data points to the end of the unfiltered servo table by using a last two data points to generate a linear equation and using the linear equation to extrapolate the four additional data points.

13. The computer program of claim 10 wherein code segment (a) filters the unfiltered servo torque table with a low pass filter.

14. The computer program of claim 13 wherein the low pass filter is a third order filter.

15. The computer program of claim 14 wherein the third order filter is a Buttersworth filter.

16. The computer program of claim 15 wherein the Buttersworth filter has the following characterization $$y(k)=0.015558*u(k)+0.046675*u(k-1)+0.046675*u(k-2)+0.015558*u(k-3)+1.829880*y(k-1)-1.254475*y(k-2)+-0.300128*y(k-3),$$

where u(k) is the kth input of the table to be filtered and y(k) is the output of the filter.

17. The computer program of claim 10 wherein code segment (c) shifts every data point of the unfiltered servo torque table by a value equal to a first of the additional data points.

18. A system for filtering an unfiltered servo torque table of a disc drive comprising:
   (a) an adder that adds a plurality of data points to a beginning of the unfiltered servo table;
   (b) an adder that adds a plurality of data points to an end of the unfiltered servo torque table;
   (c) a shifter that shifts every data point of the unfiltered servo torque table by a value; and
   (d) a filter that filters the unfiltered servo torque table shifted by shifter (c).

19. A system of claim 18 wherein the filter is a low-pass filter.

20. An apparatus for filtering an unfiltered servo torque table of a disc drive comprising:

means for adding a plurality of data points to a beginning of the unfiltered servo table;

means for adding a plurality of data points to an end of the unfiltered servo table;

means for shifting every data point of the unfiltered servo table by a value; and means for filtering the shifted unfiltered servo table.

* * * * *